US007573858B2

(12) United States Patent
Roh et al.

(10) Patent No.: US 7,573,858 B2
(45) Date of Patent: Aug. 11, 2009

(54) AD-HOC NETWORK FOR TRANSMITTING PACKETS TO PLURAL TARGET REGIONS AND PACKET TRANSMISSION METHOD THEREOF

(75) Inventors: Yong-sung Roh, Icheon-si (KR); Young-gon Choi, Suwon-si (KR); Jung-ho Kim, Suwon-si (KR); Jae-hoon Kim, Seoul (KR); Kyung-lim Kang, Suwon-si (KR); Shubhranshu Singh, Yongin-si (KR); Chang-seok Oh, Cheongju-si (KR); Sung-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 11/316,838

(22) Filed: Dec. 27, 2005

(65) Prior Publication Data

US 2006/0153157 A1   Jul. 13, 2006

(30) Foreign Application Priority Data

Dec. 28, 2004   (KR) ...................... 10-2004-0113491

(51) Int. Cl.
  *G01R 31/08* (2006.01)
(52) U.S. Cl. ...................... 370/338; 370/235; 370/395; 370/334; 370/400
(58) Field of Classification Search ................. 370/338, 370/235, 395, 334, 400
See application file for complete search history.

(56) References Cited

U.S. PATENT DOCUMENTS 6,529,498 B1 * 3/2003 Cheng ........................ 370/351

2003/0167340 A1 *  9/2003 Jonsson
2004/0018839 A1 *  1/2004 Andric et al.
2004/0095907 A1 *  5/2004 Agee et al. .................. 370/334
2004/0203380 A1 * 10/2004 Hamdi et al. ............... 455/41.2
2006/0253747 A1 * 11/2006 Gillies et al. ................ 714/712

FOREIGN PATENT DOCUMENTS

KR   10-2004-0106346 A   12/2004

OTHER PUBLICATIONS

Korean Information Technology Association: "An efficient data dissemination scheme for sensor Network with multiple target regions" Collection of Learned Papers, Autumn 2004, vol. 31, No. 2.

* cited by examiner

*Primary Examiner*—Alexander Eisen
*Assistant Examiner*—Julio R Perez
(74) *Attorney, Agent, or Firm*—Sughrue Mion, PLLC

(57) ABSTRACT

A wireless ad-hoc network for transmitting packets to target regions, and a packet transmission method thereof, are provided. The ad-hoc network includes at least one relay node for receiving a packet containing location information of at least two target regions each including at least one node, separating the received packet by the location information, forming a new packet for each instance of the location information separated from the received packet, and forwarding the new packets to corresponding target regions; and a source node for generating the packet containing the location information and transmitting the packet to the relay node. The present invention can reduce the packet transmission overhead, the packet transmission delay, and the power required for the packet transmission. Therefore, the packets can be delivered to the target regions in an efficient manner.

14 Claims, 9 Drawing Sheets

FERMAT'S POINT : P

FIG. 3B

FERMAT'S POINT : P

CENTER OF TARGET REGION
 FERMAT'S POINT

FIG. 7

AD-HOC NETWORK FOR TRANSMITTING PACKETS TO PLURAL TARGET REGIONS AND PACKET TRANSMISSION METHOD THEREOF

CROSS-REFERENCE TO RELATED APPLICATIONS

This application claims priority from Korean Patent Application No. 10-2004-0113491, filed on Dec. 28, 2004 in the Korean Intellectual Property Office, the entire disclosure of which is incorporated herein by reference.

BACKGROUND OF THE INVENTION

1. Field of the Invention

Apparatuses and methods consistent with the present invention relate generally to ad-hoc networks and packet transmissions therein, and more particularly, to ad-hoc networks wherein packets are transmitted to a plurality of target regions.

2. Description of the Related Art

A typical mobile communication system delivers data between a mobile element and a base station. The mobile element and the base station directly transmit and receive data without the data passing through any other mobile elements or nodes. In comparison, to carry packets from a source node to a destination node in an ad-hoc sensor network, the packets are directly transmitted to the destination node without using an existing infra-network. In this situation, if the destination node is not adjacent to the source node, but is instead distanced by several hops from the source node, the packets are delivered via intermediate nodes. Other nodes can be used to geocast packets from a source node to a specific region over the ad-hoc sensor network. The geocasting floods packets to nodes located in a targeted geographical region. The targeted geographical region is referred to as a target region. In the following, descriptions are made on how a source node in an ad-hoc network transmits packets to a target region.

Figure 1:
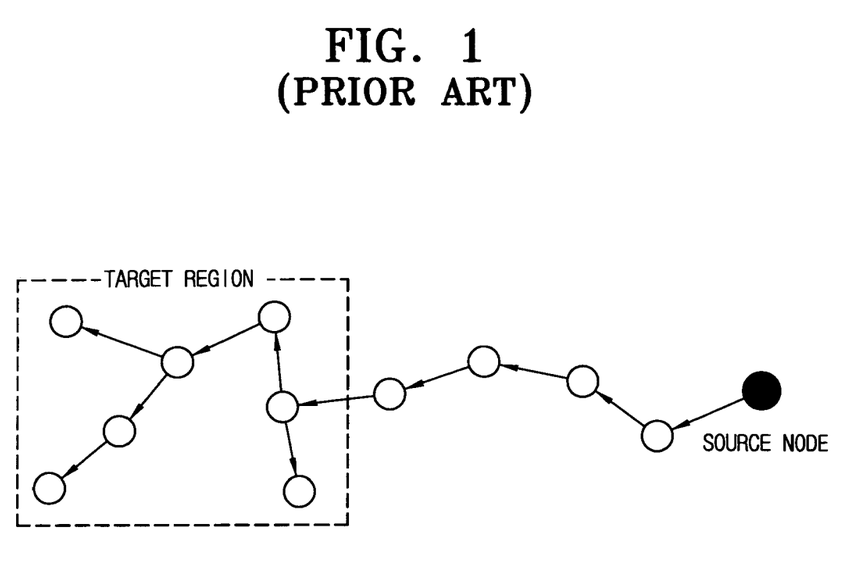
FIG. 1 illustrates a conventional packet transmission method for a target region.

FIG. 1 illustrates how to transmit packets to a conventional target region. In FIG. 1, the ad-hoc network is established with a plurality of nodes including a source node. A target region covering nodes that are to receive packets from the source node is defined within the ad-hoc network.

It is assumed that the plurality of the nodes including the source node in the ad-hoc network know their own IDs and location information, location information of the target region, and location information of one-hop neighbor nodes. The source node, which is aware of the location information of the target region, transmits the packets containing the location information of the target region, to the nearest neighbor node from the target region. Nodes receiving the packets determine whether they are located in the target region based on the location information of the target region contained in the packets. When the nodes receiving the packets do not have information as to a neighbor node nearer to the target region than themselves, the nodes determine that they are the destination of the packets and broadcast the received packets over a specified area based on the location information of the target region. Conversely, when the nodes have information of a neighbor node nearer to the target region, the nodes forward the received packets to the discovered neighbor node. As such, the packets originating from the source node can be delivered to the specified target region and flooded to the nodes therein.

Particularly, the source node transmits generated packets toward a neighbor node estimated to be the nearest node to the target region, and the packets are received at one-hop nodes (i.e., nodes adjacent to the source node by one hop). The one-hop nodes from the source node compare location information of the target region contained in the received packets with their own location information. If the location information of the target region matches their location information, or, if there is no other neighbor node determined to be nearer to the target region based on location information of their known neighbor nodes, the one-hop nodes determine that they are located in the target region and broadcast the packets over the target region. Conversely, if there is another neighbor node nearer to the target region, the one-hop nodes forward the packet to the discovered node. By repeating the above procedure, the transmission route from the source node to the target region can be established.

The plurality of nodes in the ad-hoc network can obtain IDs and location information of neighbor nodes. Generally, nodes in the ad-hoc network have guaranteed mobility. Hence, the nodes transmit and receive packets to and from neighbor nodes periodically and, thus, update information relating to the neighbor nodes.

Figure 2:
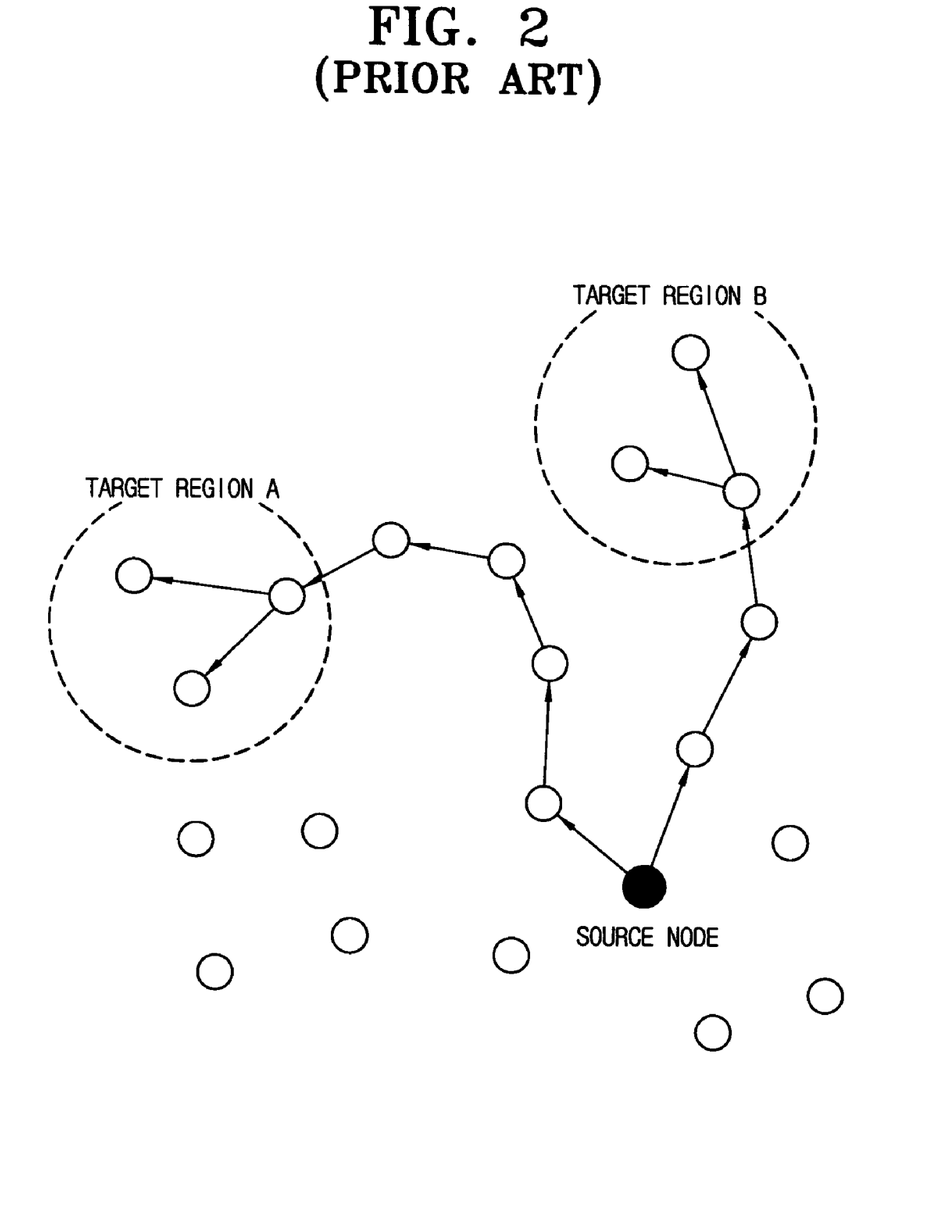
FIG. 2 illustrates a conventional packet transmission method for a plurality of target regions.

As for a plurality of target regions to which the same packets are to be delivered, the conventional ad-hoc network delivers the packets to the target regions as illustrated in FIG. 1. FIG. 2 depicts a conventional packet transmission method in relation to a plurality of target regions. In FIG. 2, the ad-hoc network includes a target region A and a target region B. A source node transmits the same packets to the target regions A and B, respectively, along different routes according to the conventional packet transmission method.

When packets are transmitted to the plurality of target regions along the different routes, excess overhead may be incurred and the packet transmission between the source node and the target regions may be delayed. In addition, as the transmission distance is extended, the packet transmission results in a waste of power used for transmitting the packet, which is inefficient.

SUMMARY OF THE INVENTION

An aspect of the present invention provides a wireless ad-hoc network for transmitting packets to a plurality of target regions with minimum overhead, and a packet transmission method thereof.

Another aspect of the present invention provides a wireless ad-hoc network for transmitting packets to a plurality of target regions by reducing a transmission distance by use of a common route to the target regions, and a packet transmission method thereof.

Still another aspect of the present invention provides a wireless ad-hoc network for transmitting packets to a plurality of target regions by minimizing a power required for the packet transmission, and a packet transmission method thereof.

In accordance with an aspect of the present invention, there is provided an ad-hoc network which includes at least one relay node for receiving a packet that contains location information of at least two target regions that have at least one node, separating the received packet into separated packets by the location information, and forwarding the separated packets to corresponding target regions; and a source node for generating a packet that contains location information and transmitting the generated packet to the relay node.

The source node may create a triangle by connecting the source node and the centers of the at least two target regions, and find a Fermat's point in the created triangle.

The relay node is a node nearest to the obtained Fermat's point.

The location information contained in the packet generated by the source node may include a location of the at least one relay node and the locations of the at least two target regions.

The relay node may separate the packet and generate a new packet when the packet contains at least one of the location information of the at least one relay node or the location information of the at least two target regions.

The relay node may forward the packet to another relay node, or to one of the at least two target regions, according to the location information contained in the packet.

The source node may divide a network area into certain regions and transmit the packet to target regions within the certain regions, if at least two target regions are placed in several directions within the network area.

In accordance with another aspect of the present invention, there is provided a packet transmission method in an ad-hoc network that includes a source node transmitting a packet to at least two target regions that have at least one node, the method including generating a packet containing location information and forwarding the generated packet to a relay node that corresponds to a Fermat's point of a triangle formed by connecting the source node to the centers of the at least two target regions; and receiving a packet that contains location information of the at least two target regions including the at least one node, separating the received packet by the location information, and flooding the separated packets to corresponding target regions.

The source node may create a triangle by connecting the source node and centers of the at least two target regions and find the Fermat's point in the created triangle.

The relay node is a nearest node to the obtained Fermat's point.

The location information contained in the packet may include a location of the at least one relay node and locations of the at least two target regions.

The relay node may separate the packet and generate a new packet when the packet contains at least one of the location information of the at least one relay node and the location information of the at least two target regions.

The relay node may forward the packet to one of the at least one relay node, and the at least two target regions according to the location information contained in the packet.

The source node may divide a network area into certain regions and transmit the packet to target regions within the certain regions, if the at least two target regions are placed in several directions within the network area.

BRIEF DESCRIPTION OF THE DRAWING FIGURES

The above and/or other aspects of the present invention will become apparent and more readily appreciated from the following description of exemplary embodiments, taken in conjunction with the accompanying drawing figures of which.

DETAILED DESCRIPTION OF THE EXEMPLARY EMBODIMENTS OF THE PRESENT INVENTION

Certain exemplary embodiments of the present invention will now be described in greater detail with reference to the accompanying drawings. In the description, each point A, B, and C means a source address corresponding to a node transmitting a packet and the centers of two target regions for receiving the packet.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the description of the present invention with unnecessary detail.

Figure 3A:
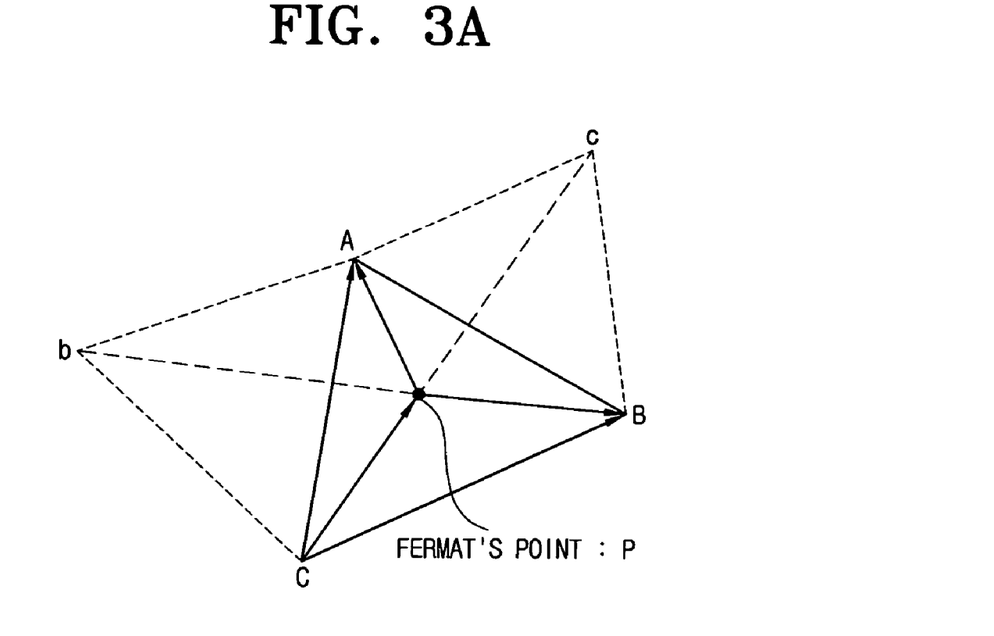
FIG. 3A depicts how to find a Fermat's point, according to an exemplary embodiment of the present invention.

FIG. 3A depicts how to find a Fermat's point according to an exemplary embodiment of the present invention.

Referring to FIG. 3A, a Fermat's point P is placed in a triangle ABC having interior angles less than 120 degrees. The Fermat's point P lies on three diagonal lines from $\angle ABC$, $\angle BAC$, and $\angle BCA$ with the minimum distances to the respective vertices of the triangle. According to exemplary embodiments of the present invention, the Fermat's point is used as a common route for the efficient packet transmission to a plurality of target regions in an ad-hoc network. The Fermat's point is placed at the end of the common route for the packet transmission, and serves as a relay node where the common transmitted packets are branched. The packets transmitted along the common transmission route are branched at the Fermat's point, that is, at the relay node, and delivered to the plurality of target regions.

As shown in FIG. 3A, to find the Fermat's point, an equilateral triangle BcA is drawn based on a line AB. A line is drawn from a vertex c of the equilateral triangle BcA to a vertex C of the triangle ABC. Another equilateral triangle AbC is drawn based on a line AC. A line is drawn from a vertex b of the equilateral triangle AbC to a vertex B of the triangle ABC. Likewise, still another equilateral triangle is drawn based on the line BC. An intersection point of the lines bB, cC, and aA is the Fermat's point P. The line aA is not shown in FIG. 3A. The straight lines AP, BP, and CP have the minimum distances based on the Fermat's point P. In such a process to determine a Fermat's point P, it is the most desirable case to verify all of the vertices in the triangle ABC, but it is also sufficient to verify two vertices in the triangle ABC for a more simplified process.

There are two ways to reach the vertex A and the vertex B from the vertex C. First, the line CA connecting the vertex C and the vertex A and the line CB connecting the vertex C and the vertex B can be utilized. Secondly, the Fermat's point P can be utilized, that is, the line CP connecting the vertex C to the Fermat's point P, the line PA connecting the Fermat's point P to the vertex A, and the line PB connecting the Fermat's point P and the vertex B are used. The line CA and the line CB of the first manner are longer than the line CP, the line PA, and the line PB of the second manner. Accordingly, the second manner is more efficient than the first manner.

Figure 3B:
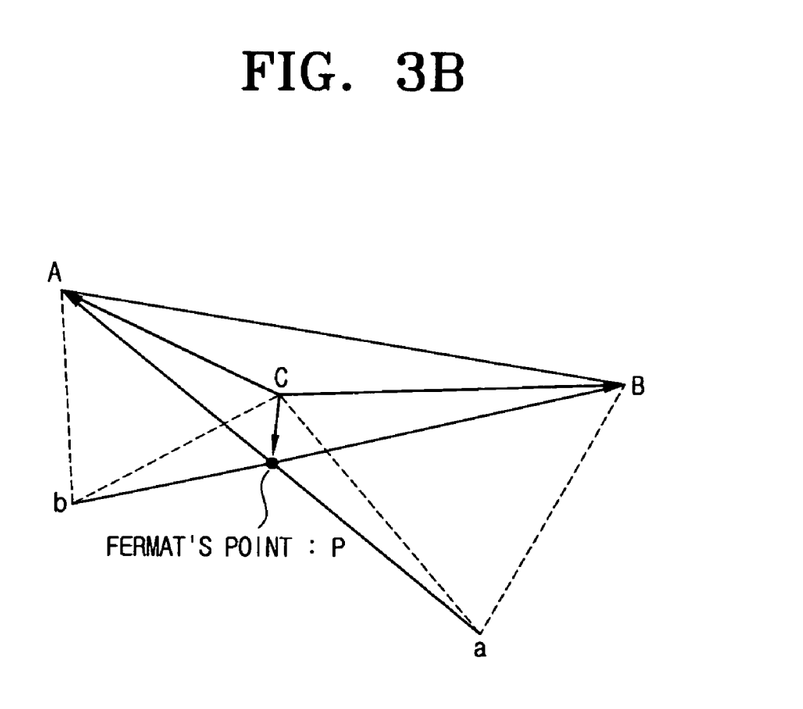
FIG. 3B depicts how to find a Fermat's point, according to an exemplary embodiment of the present invention.

Referring to FIG. 3B, in the same manner as explained above, a Fermat's point P can be discovered outside a triangle ABC with one of the interior angles greater than 120 degrees. In this case, transmitting a packet to each target region by using the conventional method is more desirable than passing through the Fermat's point P using the above-mentioned method.

Similarly to FIG. 3A, there are two ways to reach a vertex A and a vertex B from a vertex C. The first manner is the same as in FIG. 3A. The second manner using the Fermat's point P extends a line CP connecting the vertex C and the Fermat's point P, a line PA connecting the Fermat's point P and the vertex A, and a line PB connecting the Fermat's point P and the vertex B. As the lines CA and CB of the first manner are shorter than the lines CP, PA, and PB of the second manner, the second manner based on the Fermat's point P is less efficient than the first manner.

As illustrated in FIG. 3A and FIG. 3B, the location of the Fermat's point depends on the degree of three interior angles of the triangle. If any one of the three interior angles is greater than 120 degrees, it is more efficient to use the conventional method of transmitting a packet to a plurality of target regions than to use the Fermat's point.

Figure 4A:
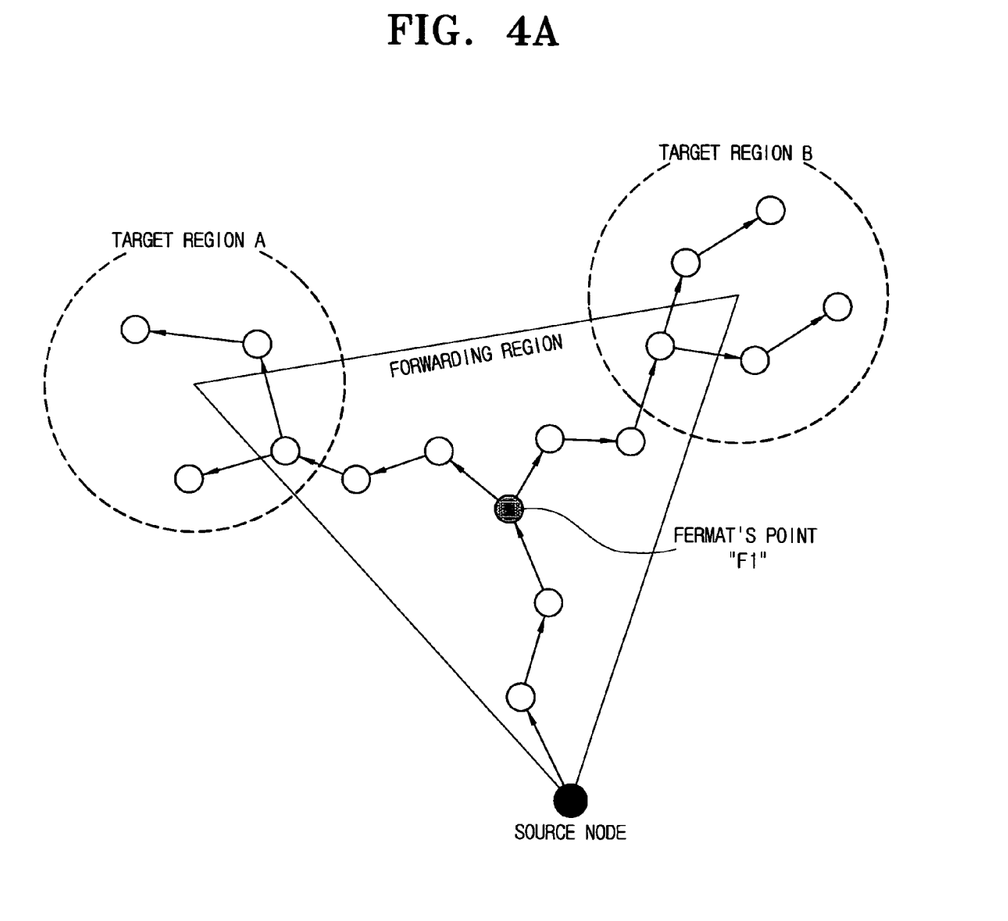
FIG. 4A depicts how to establish a packet transmission route to a plurality of target regions, according to an exemplary embodiment of the present invention.

FIG. 4A depicts establishment of a packet transmission route to a plurality of target regions, according to an exemplary embodiment of the present invention.

Referring now to FIG. 4A, an ad-hoc network covers a source node that transmits packets, a target region A and a target region B where the packets from the source node arrive.

The target region A and the target region B respectively include at least one node.

In FIG. 4A, the source node creates, a triangle by connecting to a center of the target region A and a center of the target region B. The source node knows location information relating to a plurality of target regions (including target region A and target region B) to which its location information and packets are to be transmitted. The source node discovers a Fermat's point in the created triangle.

In particular, to find the Fermat's point in reference to FIG. 4A, the center of the target region A corresponds to the vertex A of the triangle ABC, the center of the target region B corresponding to the vertex B of the triangle ABC, and the source node corresponds to the vertex C of the triangle ABC. The source node corresponding to the vertex C of the triangle ABC discovers the Fermat's point in the manner explained above with reference to FIG. 3A. As a result, the triangle consisting of the target region A, the target region B, and the source node has the Fermat's point F1. If all three interior angles of this triangle do not exceed 120 degrees, the Fermat's point F1 is placed inside the triangle.

It is noted that if a node is located at the Fermat's point F1, the node becomes a relay node. If there is no node positioned at the Fermat's point F1, the nearest node to the Fermat's point F1 may serve as a relay node.

Upon discovering the Fermat's point F1, to transmit a packet to nodes in a plurality of target regions, the source node generates a packet containing location of the target regions as well as the location information of the Fermat's point F1. Next, the source node sends the packet for the nearest neighbor node to the Fermat's point F1 in reference to information of its known neighbor nodes. A node receiving the packet determines whether it is the nearest node to the Fermat's point F1 based on the location information of the Fermat's point F1 that is contained in the received packet. If the node has information of another neighbor node that is nearer to the Fermat's point F1 than itself, the node forwards the received packet to the nearest node.

Conversely, if the node receiving the packet does not have information relating to a neighbor node that is nearer to the Fermat's point F1, the node designates itself as the Fermat's point F1. The node designated to be the Fermat's point F1 selects the nearest neighbor nodes to the target regions, respectively, and forwards the packet to the selected neighbor nodes so as to deliver the packet to the target regions. A neighbor node receiving the packet determines whether it is the nearest node to the target region based on the location information of the target region contained in the received packet. If the neighbor node has information relating to a nearest neighbor node to the target region, the received packet is forwarded to the nearest neighbor node.

If the neighbor node does not have information relating to the nearest neighbor node to the target region, the neighbor node determines it is the destination in the target region and floods the packet over the target region in reference to the location information of the target region. By repeating the above procedure, the packet originated from the source node can be delivered to at least one target region and flooded to nodes located in the target region.

Figure 4B:
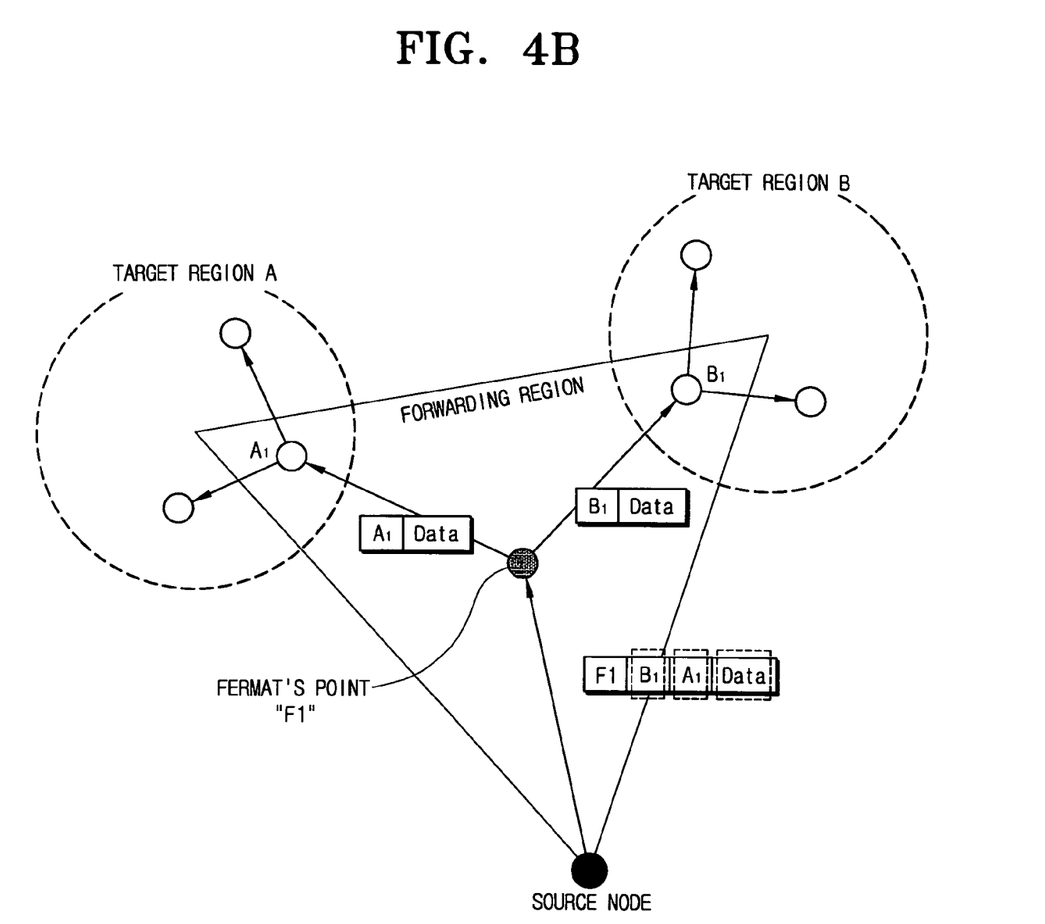
FIG. 4B depicts how to transmit a packet to a plurality of target regions, according to an exemplary embodiment of the present invention.

FIG. 4B depicts how to transmit a packet to a plurality of target regions, according to an exemplary embodiment of the present invention.

In FIG. 4B, a source node selects a target region, discovers a Fermat's point using information including information as to the selected target region, and transmits a packet to the target region according to the above-mentioned method. The source node forwards the packet using location information of neighbor nodes up to a forwarding region before the plurality of target regions. A node, which is located in the target region and receives the packet, multicasts the received packet to whole node within the target region.

To this end, the source node generates a packet destined for a target region A and a target region B. As shown in FIG. 4B, the generated packet contains location information of the Fermat's point F1, that is, an address of a relay node, location information of a first node B1 in the target region B, location information of a first node A1 in the target region A, and data to be delivered.

When the source node transmits the generated packet according to the above-mentioned method, its neighbor nodes forward the packet to the relay node. The forwarded packet is branched at the relay node. The location information of the relay node is removed from the packet. The location information of the first node B1 in the target region B and the location information of the first node A1 in the target region A are separated from the packet. The data to be delivered to the target regions is duplicated as many times as the number of the target regions. The relay node generates a new packet containing the location information of the first node B1 and the copied data. The relay node also generates a new packet containing the location information of the first node A1 and the copied data. The new packets are transmitted to the first nodes B1 and A1, respectively, according to the location information contained therein. The first nodes B1 and A1 multicast the received packets to nodes in their respective target regions.

The ad-hoc network delivers the packet along a common packet transmission route via a Fermat's point. Thus, the packet transmission overhead can be reduced and the power required for the transmission can be saved in comparison with the conventional packet transmission method.

Figure 5A:
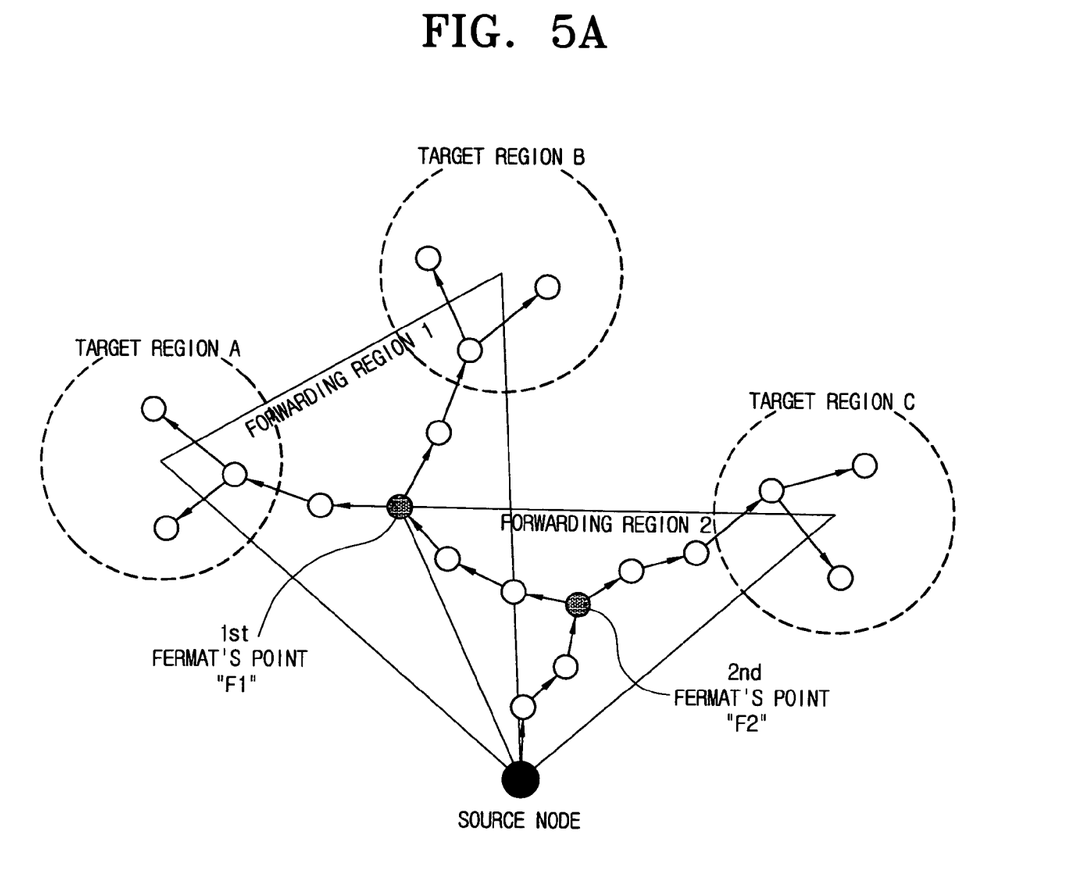
FIG. 5A depicts how to establish a packet transmission route to a plurality of target regions, according to an exemplary embodiment of the present invention.

FIG. 5A depicts how to establish a packet transmission route to a plurality of target regions, according to another exemplary embodiment of the present invention.

As illustrated in FIG. 5A, an ad-hoc network covers a source node that is to transmit a packet, a target region A, a target region B, and a target region C. The target regions A, B, and C receive the packet from the source node. First, the source node creates a first triangle consisting of the source node, the center of the target region A, and the center of the target region B, and acquires a Fermat's point in the created first triangle. The detailed description as to how to find the Fermat's point has been provided above and thus is omitted for brevity. A first Fermat's point F1 is placed in the first triangle, and a first forwarding region is defined.

Upon acquiring the first Fermat's point F1, the source node creates a second triangle consisting of the second node, the first Fermat's point F1 and the center of the target region C. The source node acquires a Fermat's point in the created second triangle, for example, using the technique described above with reference to FIG. 3A. The second Fermat's point F2 is placed in the second triangle, and a second forwarding region is defined.

Upon obtaining the first and second Fermat's points F1 and F2, the source node transmits a packet to the plurality of the target regions A, B, and C via the relay nodes, which are the Fermat's points, according to the method described above with reference to FIG. 4A.

Figure 5B:
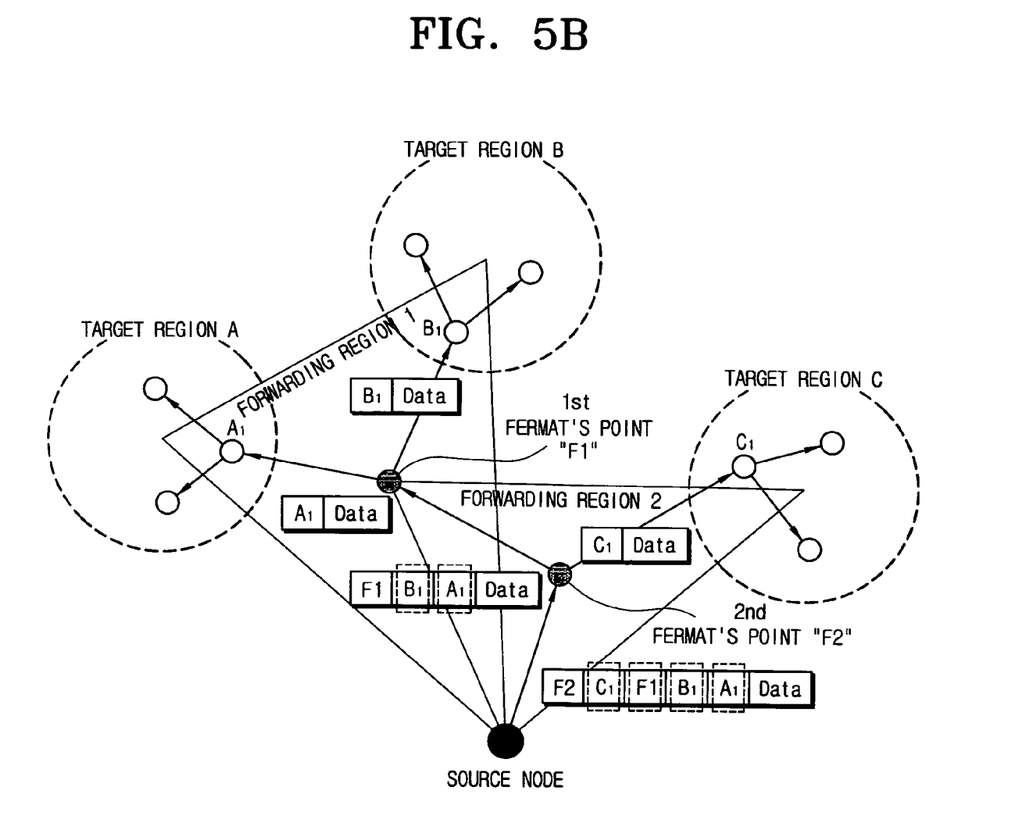
FIG. 5B depicts how to transmit a packet to a plurality of target regions, according to another exemplary embodiment of the present invention.

FIG. 5B depicts how to transmit a packet to a plurality of target regions according to another exemplary embodiment of the present invention.

Referring to FIG. 5B, a source node generates a packet to be transmitted to target regions A, B, and C. As illustrated in FIG. 5B, the generated packet contains location information of a second Fermat's point F2, location information of a first node C1 of the target region C, location information of a first Fermat's point F1, location information of a first node B1 of the target region B, location information of a first node A1 of the target region A, and data to be delivered.

The source node forwards the generated packet to the node F2 corresponding to the second Fermat's point based on the location information in the packet, according to the aforementioned method. The forwarded packet is separated at the node F2. The location information of the node F2 corresponding to the second Fermat's point is removed from the packet. The location information of the first node C1 of the target region C is separated from the packet by the node F2. The data in the packet is copied to be delivered to the target region C. The node F2 corresponding to the second Fermat's point generates a new packet containing the separated location information of the first node C1 and the copy of the data. The new packet is delivered to the first node C1 according to the location information contained therein. The information remaining in the packet after the separation of the location information of the first node C1 is transmitted to the node F1 corresponding to the first Fermat's point based on the location information therein. The first node C1 multicasts the received packet to nodes in the target region C. The packet delivered to the node F1 is separated at the node F1. The location information of the node F1 is removed from the packet. The location information of the first node B1 of the target region B and the location information of the first node A1 of the target region A are separated from the packet. The data to be delivered to the target regions is copied once for the target region A and once for the target region B. A new packet is generated with the separated location information of the first node B1 and a copy of the data. A new packet is generated with the separated location information of the first node A1 and the copy data. The new packets generated are transmitted to the first nodes A1 and B1, respectively, according to the location information in the packets. The first node A1 multicasts the data in the packet received at the first node A1 to nodes in the target region A. The first node B1 multicasts the data in the packet received at the first node B1 to nodes in the target region B.

Figure 6:
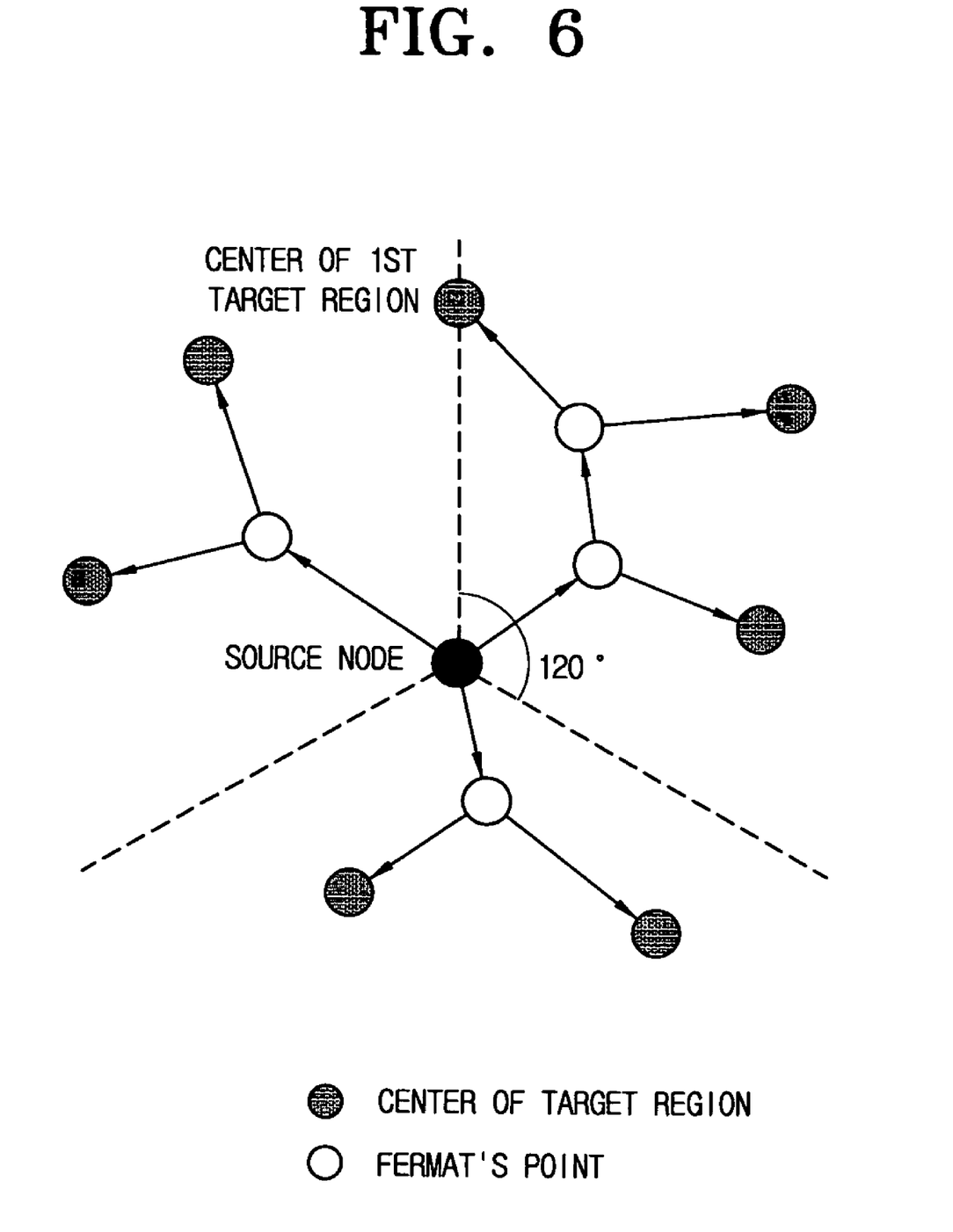
FIG. 6 depicts how to establish a packet transmission route to a plurality of target regions, according to still another exemplary embodiment of the present invention.

FIG. 6 depicts how to establish a packet transmission route to a plurality of target regions according to still another exemplary embodiment of the present invention. As shown in FIG. 6, a plurality of target regions is placed around the source node in an ad-hoc network. Preferably, but not necessarily, the source node divides the ad-hoc network area by 120 degrees, finds Fermat's points with respect to a plurality of target regions in each 120 degrees, and transmits a packet to the plurality of the target regions via the obtained Fermat's points.

It is noted that the source node may divide the ad-hoc network area by a number of degrees less than 120 degrees for the packet transmission. In this case, however, the number of Fermat's points increases and the packet transmission distance also increases. Thus, it is less efficient to divide the network area by a number of degrees less than 120 degrees, than it is to divide the network area by 120 degrees. Alternatively, the source node may divide the ad-hoc network area by a number of degrees greater than 120 degrees for the packet transmission. However, the division by a number of degrees greater than 120 degrees is inefficient to transmit the packet via the Fermat's points as explained above with reference to FIG. 3B. Accordingly, it is advantageous, in view of the reduced network traffic, the decreased delay, and the energy efficiency, for the source node to divide the ad-hoc network area by 120 degrees and transmit packets to a plurality of target regions along optimal paths via Fermat's points.

Figure 7:
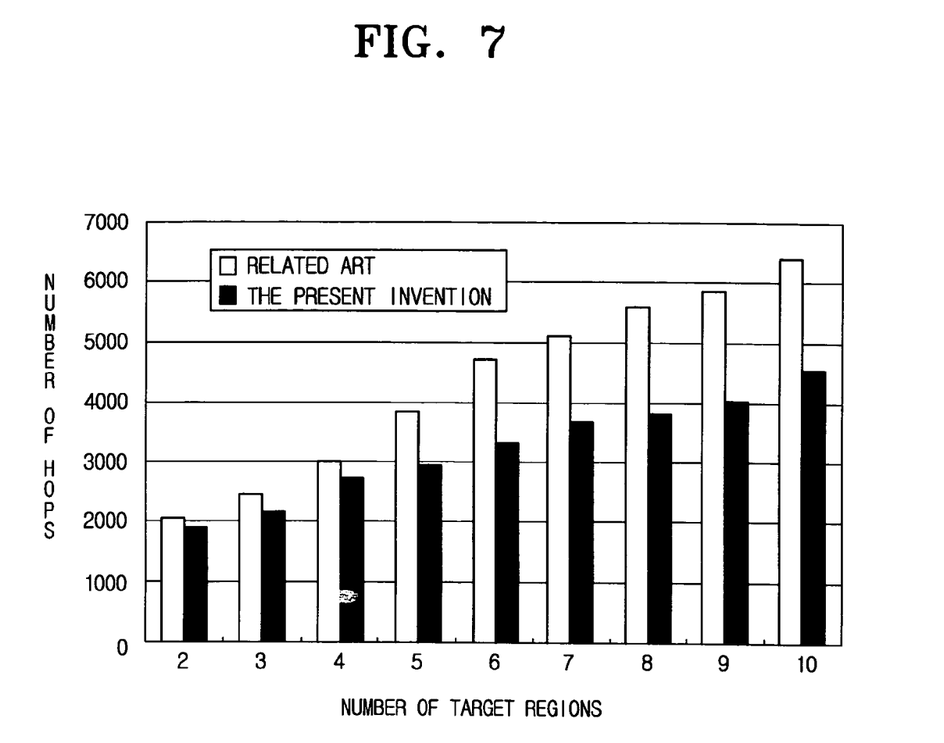
FIG. 7 illustrates experimental results, according to an exemplary embodiment of the present invention.

FIG. 7 illustrates experimental results, according to an exemplary embodiment of the present invention. Specifically, the results are graphed to illustrate the length of the packet transmission route in relation to the number of target regions in an ad-hoc network that is 1000 m×1000 m in size and includes a source node, for both a packet transmission method of the related art and according to an exemplary embodiment of the present invention. The horizontal axis of the graph indicates the number of the target regions ranging from 2 to 10. The vertical axis indicates the length of the packet transmission route as the number of hops.

As shown in FIG. 7, for a small number of target regions to which the packet is transmitted, there is little difference in the lengths of the packet transmission paths between the related art method and the exemplary method of the present invention. In contrast, for a larger number of target regions, it can be seen that the difference in the lengths of the packet transmission paths between the related art method and the exemplary method of the present invention increases. The packet transmission method with respect to the plurality of target regions according to an exemplary embodiment of the present invention improves the efficiency by a maximum of 30% in comparison with the related art method.

In view of the above, exemplary embodiments of the present invention can reduce the packet transmission overhead, the packet transmission delay and the power required for, the packet transmission. Therefore, the packets can be delivered to a plurality of target regions in an efficient manner.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. An ad-hoc network comprising:
   a relay node which receives a packet comprising first location information of a first target region including at least one node and second location information of a second target region including at least one node, separates the packet based on the location information to form a first packet containing the first location information and a second packet containing the second location information, and forwards the first packet to the first target region and the second packet to the second target region; and
   a source node which generates the packet comprising the first location information and the second location information, and transmits the packet to the relay node,
   finds a Fermat's point of a triangle formed by the source node, a center of the first target region and a center of the second target region; and
   wherein the relay node is a node nearest to the Fermat' point.

2. The ad-hoc network according to claim 1, wherein the packet generated by the source node further comprises third location information of the relay node.

3. The ad-hoc network according to claim 2, wherein the relay node separates the packet into a plurality of new packets if the packet comprises at least one of the third location information and the first and second location information.

4. The ad-hoc network according to claim 1, wherein the relay node forwards the first packet to one of an other relay node and the first target region, and forwards the second packet to one of the other relay node and the second target region, according to the location information in the packet.

5. The ad-hoc network according to claim 1, wherein the source node divides a network area into a plurality of regions, and
   wherein the source node transmits the first packet to the first target region and the second packet to the second target region within the regions of the network area, if the first target region and the second target region are placed in different directions within the network area.

6. The ad-hoc network according to claim 5, wherein the source node divides the network area into regions of 120 degrees.

7. The ad-hoc network according to claim 1, wherein the packet further comprises third location information corresponding to the location information of the relay node at the Fermat's point and the data to be delivered.

8. The ad-hoc network according to claim 7, wherein the third location information corresponding to the location information of the relay node is removed from the packet when the packet is separated.

9. A packet transmission method in an ad-hoc network that includes a source node transmitting a packet to at least two target regions each having at least one node, the method comprising:
   generating the packet including location information of the at least two target regions each having at least one node, and forwarding the packet to a relay node that corresponds to a Fermat's point; and
   receiving the packet at the relay node, and separating the packet by the location information to form a first packet containing first location information and a second packet containing second location information, and multicasting the first and second packets to the corresponding target regions,
   finds a Fermat's point of a triangle formed by the source node, a center of the first target region and a center of the second target region; and
   wherein the relay node is a node nearest to the Fermat's point.

10. The packet transmission method according to claim 9, wherein the location information in the packet includes a location of the relay node and locations of the at least two target regions.

11. The packet transmission method according to claim 9, wherein the relay node separates the packet and forms the first and second packets, if the packet comprises at least one of location information of the relay node and location information of the at least two target regions.

12. The packet transmission method according to claim 9, wherein the relay node forwards the first packet to one of an other relay node and one of the target regions, according to the first location information in the first packet, and
   wherein the relay node forwards the second packet to one of the other relay node, and one of the target regions, according to the second location information in the second packet.

13. The packet transmission method according to claim 9, wherein the source node divides a network area into a plurality of regions, and
   wherein the source node transmits the first packet to a first target region and the second packet to a second target region within the regions of the network area, if the first target region and the second target region are placed in different direction within the network area.

14. The ad-hoc network according to claim 13, wherein the source node divides the network area into regions of 120 degrees.

* * * * *